United States Patent
Clarke, Jr. et al.

(10) Patent No.: US 6,291,983 B1
(45) Date of Patent: Sep. 18, 2001

(54) SELECTING AND MONITORING SIGNAL LINES WITH SPURIOUS TRANSIENTS IN BROADBAND NETWORK

(75) Inventors: Edward Payson Clarke, Jr., Ossining; Robert Alan Flavin, Yorktown Heights; Perwaiz Nihal, Fishkill, all of NY (US); Geoffrey Hale Purdy, Roxbury, CT (US); Norbert George Vogl, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/066,278

(22) Filed: Apr. 24, 1998

(51) Int. Cl.[7] .......................... G01R 19/00; G01R 23/16; G01R 27/28; H04N 17/00

(52) U.S. Cl. .................. 324/102; 324/76.11; 324/76.12; 348/192

(58) Field of Search .............................. 324/76.11, 76.12, 324/102, 618, 76.59; 455/5.1, 6.1, 6.3, 67.3; 348/180, 192

(56) References Cited

U.S. PATENT DOCUMENTS

| | | | |
|---|---|---|---|
| 5,170,359 | * | 12/1992 | Sax et al. .............................. 324/102 |
| 5,717,325 | * | 2/1998 | Leeb et al. .......................... 324/76.12 |
| 5,808,671 | * | 9/1998 | Maycock et al. ..................... 348/180 |

OTHER PUBLICATIONS

"Delivering Two–Way Service", Hewlett Packard, A special Supplement to Communications Technology, A Return Path Primer.

B. Morgan, R&D Project Manager, Hewlett–Packard, 1) Insights into Proper Return Path Alignment, CED: Communications Engineering & Design, Oct. 2, 1996) "Proactive Return Path Maintenace", and 3) "Noise and Ingress Performance in the Return Path".

Single Pole Dougl Throw (SPDT) Switch, Phillips Semiconductor RF Communications Product, Product Specification, 853–1577 04269, pp. 1268–1277, Oct. 10, 1991.

* cited by examiner

Primary Examiner—Safet Metjahic
Assistant Examiner—Anjan K Deb
(74) Attorney, Agent, or Firm—Louis J. Percello

(57) ABSTRACT

The invention is a broadband network monitoring system and method. The system has one or more RF carrier generators that generate one or more generator signals, called a reference signal, each of the generator signals having a generator signal frequency. One or more RF transient detectors sense a line signal on one or more broadband lines in the broadband network. Each line signal has one or more test signals applied by a remote RF carrier generator. Each test signal has a frequency equal to one of the reference signals. Each RF transient detector senses and compares the test signal and the reference signal in various ways to produce a transient indicator when the test signal and reference/generator signal are not the same. The transient indicator indicates that there may be a perturbation or some other problem in the respective broadband line. A controller is connected to each of the RF transient detectors and controls an RF switch and an analyzer. The RF switch has two or more inputs connected to each respective RF detector and one output connected to the analyzer. When the controller receives a transient indicator, it controls the switch to connect the broadband line producing the transient indicator to the analyzer and, in a preferred embodiment, starts the analyzer. In this way, all of the broadband lines can be monitored and analyzed for perturbations using a single analyzer.

8 Claims, 3 Drawing Sheets

SELECTING AND MONITORING SIGNAL LINES WITH SPURIOUS TRANSIENTS IN BROADBAND NETWORK

FIELD OF THE INVENTION

This invention relates to selecting and monitoring signal lines with spurious transients in a broadband network.

BACKGROUND OF THE INVENTION

Broadband networks are systems of network components which receive and/or transmit broadband signals where the signals are analog wave forms within the 5 MHz (megahertz) to 1 GHz (gigahertz) frequency range; contain information encoded with analog modulation; and are combined through multiplexing (typically, frequency division multiplexing). These network components are interconnected through network connections. Examples of broadband networks include CATV/MATV (Community Access Television, Multiple Access Television) systems and data networks. A CATV/MATV system is typically composed of one or more "head-ends" which deliver television channels to a community of homes over an HFC (hybrid-fiber coax) infrastructure. The network components in a CATV/MATV broadband network include RF (radio-frequency) modulators, RF demodulators, frequency converters, band-pass filters, band-trap filters, combiners, splitters, taps, attenuators, equalizers, amplifiers, broadband switches, fiber-optic nodes, and metering equipment. These components are connected to each other through transmission lines which are typically coaxial cable.

A broadband network will typically be spread over a large physical area, passing hundreds of thousands of residential homes and commercial businesses. Due to the breadth of the network and the complex nature of the environments the broadband network encompasses, interference of signals on the broadband network is of a large concern to the engineers maintaining the broadband network. Noise may enter into a broadband network in many ways. For instance, if a cable on the broadband network is not properly terminated, that cable can act as an antenna and allow outside signals to enter into the broadband network. The cable may also cause portions of the broadband signal to be reflected back into the network at the termination due to the impedance mismatch of an improper termination. The long lengths of cable run to each home can also act as antennas and allow outside broadband signals, such as those from CB radios, to enter into the network. Further, the cables and equipment themselves introduce attenuation and noise into the system. An engineer at a cable system quickly learns to identify and compensate for the predictable sources of noise within the broadband network. However there is a type of noise, called transient noise (sometimes also referred to as impulse noise), which is unpredictable, short-lived, and difficult to work around.

Transients are short lived changes of voltage, frequency and/or amplitude which interfere with broadband signals. Transients may be generated from neon signs and/or vehicle ignitions. Transients may also be generated from devices such as televisions, appliances, lighting equipment, and cable modems being turned on and off or from devices which have poor wiring (e.g. loose connections). The duration of a transient is often related to the size of the electronic device causing the transient. i.e., a large capacitor will often cause a lengthy (approximately 100 milliseconds) transient, a small capacitor may be the cause of a short (approximately 1 millisecond) transient. As electronic devices are reduced in size, it is expected that the duration of transients will also be reduced.

The head-end of a broadband network typically transmits television channels and other outbound data within the broadband spectrum of 54–750 MHz. This forward spectrum is amplified and split through a tree-and-branch configuration to be presented to each customer (residence, business) of the broadband network. Increasingly, broadband networks are being configured to allow certain customers to transmit television channels and other data back through the tree-and-branch network to the head-end. These customers transmit within a return spectrum of 5–50 MHz. Typical information transmitted within the return spectrum is locally generated television channels, requests from converter boxes to view pay-per-view events, and computer information requests from cable modems such as requests for internet access or requests for world wide web pages. Examples of customers are schools which transmit television broadcasts of sporting events; town halls which transmit broadcasts of town meetings; and residential homes which are equipped with cable modems that transmit (and receive) digital computer data. Unfortunately the 5–50 MHz range of the broadband spectrum is very susceptible to transient noise. And because of the tree-and-branch architecture of a typical broadband network, the noise (transient or otherwise) present on one branch of the network may get accumulated with noise present on other branches of the network during its transmission from the sources to the head-end. This accumulated noise may affects the broadband signals transmitted on all the combined branches. Hence, noise present on one branch of a broadband network can interfere with signals present on a sibling branch.

A head-end will typically have a device such as a television demodulator or a cable modem which listens for signals within the return spectrum of the broadband network to receive return transmissions generated from the customers. A head-end may, for example, receive a sports event broadcast from a local school within the spectrum range of 30–36 MHz and rebroadcast that television broadcast onto a forward channel to its subscriber base. If transient noise interferes with the 30–36 MHz signals, that noise may interfere with the broadcast picture or sound by introducing sparkles or pops and a degraded signal will be broadcast to the cable systems customers. Of even more concern to a cable system, is the effect of transient noise on portions of the return spectrum containing digital data. Cable systems may be equipped with cable modems which receive digital information transmitted by the subscribers. This digital information can be information from a cable pay-per-view converter box, a set-top-box, or a personal computer. When digital information transmitted by a subscriber is corrupted due to noise, that information is lost and must be retransmitted. Continual retransmission of digital data within the return spectrum of a broadband network cuts down on the effective bandwidth of the network. If transient noise can be minimized, the return spectrum of the broadband network can be used more effectively and efficiently.

Several metering devices are capable of monitoring a broadband network for transient signals. These devices typically are composed of a carrier generator and a comparator. The carrier generator is placed in the vicinity of a suspected noisy branch of the broadband network and transmits a high quality test signal. The comparator is located upstream of the noisy branch, typically at the head-end of the network, and monitors the received test signal, looking for perturbations. Through careful selection of carrier generators and comparators, the presence of many types of transient noise can be identified Types of comparators include phase and amplitude difference detectors (such as the CW Tester developed by CableLabs) and power detectors. Cable modems themselves can also be used as comparators when they are configured to report on the number of digital packets lost.

Because transient signals are of a very short duration, special equipment is needed to analyze and characterize them. An engineer of a broadband network will typically use a spectrum analyzer to diagnose and repair problems on the network. However, because the spectrum analyzer displays the average amount of energy on a given frequency over time, these analyzers are not effective tools for trouble shooting transient noise problems. A transient fluctuation of a signal may have come and gone during the time a spectrum analyzer samples the energy of the perturbed frequency. The normal, non-perturbed, signal may preside over the perturbed signal and yield an average signal strength which is within acceptable limits. Specialized devices such as digital oscilloscopes which can monitor in great detail changes in energy over a limited portion of frequency bandwidth are needed to characterize transient noise problems on broadband networks.

See the Applications and Technology article "Delivering Two-Way Service" published by Hewlett Packard for a discussion of the noise ingress found on cable systems. And, see the three part series, "Insights into proper return path alignment", "Proactive return path maintenance", and "Noise and ingress performance in the return path" also published by Hewlett Packard for a discussion of common techniques for measuring, monitoring, and analyzing noise present in a broadband network. There references are herein incorporated by reference in their entirety.

STATEMENT OF PROBLEMS WITH THE PRIOR ART

The prior art does not have an effective way to monitor and capture transient noise of many branches of a broadband network simultaneously. Currently, an engineer will install an expensive meter, such as a digital oscilloscope, onto one suspect branch of a broadband network which is equipped with a transient noise detector. When the transient noise detector signals that a transient is present, the meter is put into operation and captures a trace of the transient noise. However, during the time that the transient noise is not present on the branch, the meter is idle. Transient noise may occur on other non-monitored branches of the broadband network and not be captured for analysis by the meter. Because transients occur on an infrequent and unpredictable basis, there can be long periods of time when the meter is idle. Hence, the meter is being used in an inefficient manner.

Engineers will often combine several branches together and connect the meter to the combination of branches in an attempt to work around this problem. Unfortunately, this combination can cause transient noise present on two or more branches to be combined and appear as one noise problem. The meter cannot distinguish between noise present on the different legs of the combined branches and therefore will not present the engineer with an accurate analysis of the transient noise present on an individual branch.

OBJECTS OF THE INVENTION

An object of this invention is an improved system and method for economically and/or effectively monitoring fast transients on broadband networking systems with multiple lines.

SUMMARY OF THE INVENTION

The invention is a broadband network monitoring system and method. The system has one or more RF carrier generators that generate one or more generator signals, called a reference signal, each of the generator signals having a generator signal frequency. One or more RF transient detectors sense a line signal on one or more broadband lines in the broadband network. Each line signal has one or more test signals applied by a remote RF carrier generator. Each test signal has a frequency equal to one of the reference signals. Each RF transient detector senses and compares the test signal and the reference signal in various ways to produce a transient indicator when the test signal and reference/generator signal are not the same. The transient indicator indicates that there may be a perturbation or some other problem in the respective broadband line. A controller is connected to each of the RF transient detectors and controls an RF switch and an analyzer. The RF switch has two or more inputs connected to each respective RF detector and one output connected to the analyzer. When the controller receives a transient indicator, it controls the switch to connect the broadband line producing the transient indicator to the analyzer and, in a preferred embodiment, starts the analyzer. In this way, all of the broadband lines can be monitored and analyzed for perturbations using a single analyzer.

BRIEF DESCRIPTION OF THE DRAWINGS

The foregoing and other objects, aspects and advantages will be better understood from the following detailed description of preferred embodiments of the invention with reference to the drawings that include the following.

DETAILED DESCRIPTION OF THE INVENTION

Figure 1:
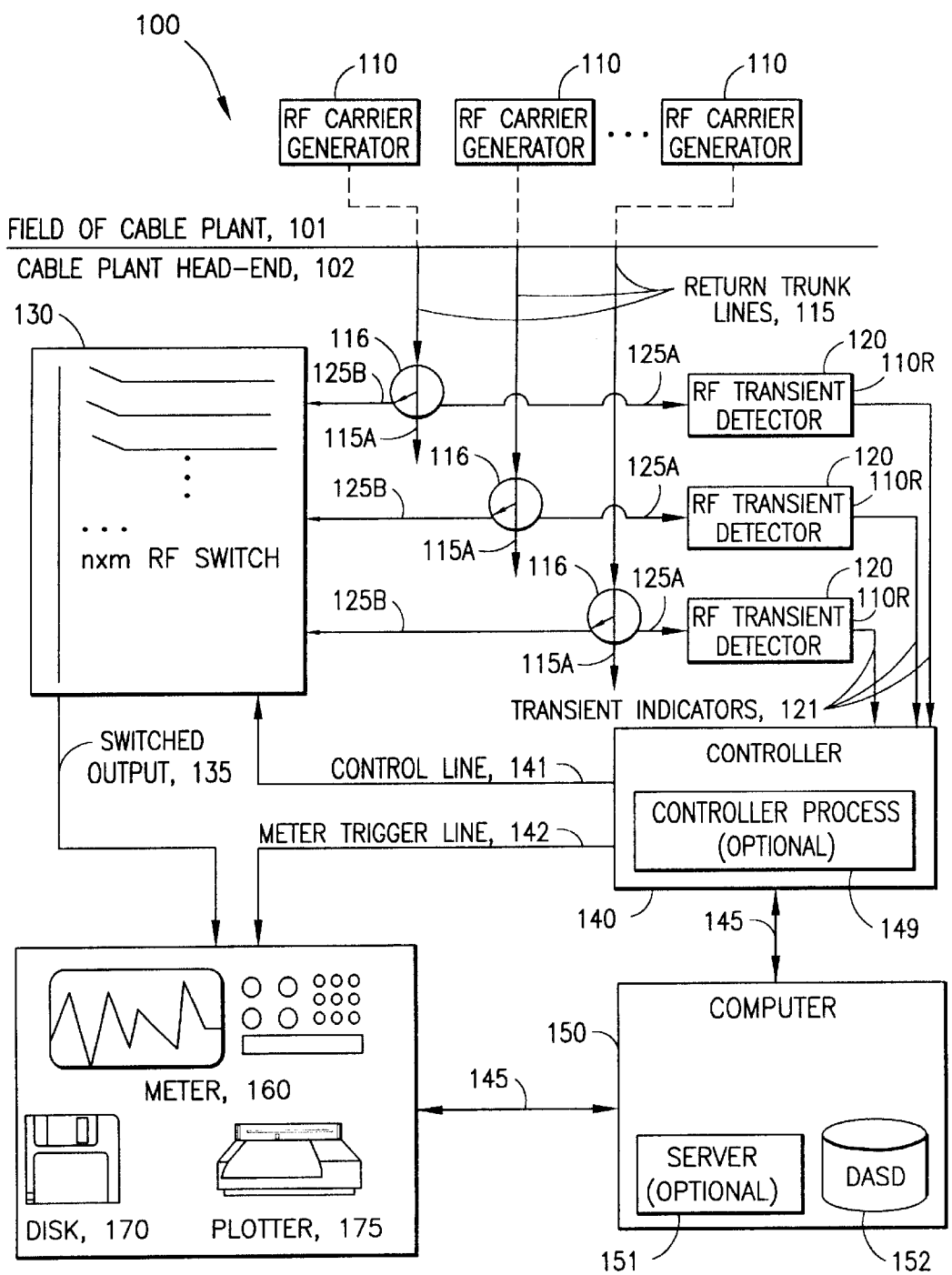
FIG. 1 is a block diagram of one preferred embodiment of the system.

FIG. 1 is a block diagram of one preferred embodiment of the system 100. The system 100 comprises two or more broadband lines 115 which are split into tapped return lines 125A and 125B. One tapped return line 125B goes to an RF switch 130. The other tapped return line 125A goes to an RF transient detector 120 which is connected to a controller 140 through a transient indicator line 121. An output 135 of the RF switch 130 is a broadband switched output 135 connected to an analyzer/meter 160, preferably a digital oscilloscope. The RF transient detectors 120 use various techniques to determine if there is a problem or perturbation in the tapped return line 125A which they are monitoring. If there is a problem/perturbation, a signal is produced on the transient indicator 121 and inputted to a controller 140. The controller 140 configures the RF switch 130 through a control line 141 to switch the problem line, i.e. the tapped return line 125B associated with the tapped return line 125A connected to the signaling RF transient detector 120, to the switched output 135. In one preferred embodiment, the controller 140 also sends a trigger signal 142 to the meter 160 to cause the meter 160 to monitor and analyze the problem signal provided on the switched output 135. In alternative embodiments, the monitored signal and/or analysis is provided to other connected output devices such as a plotter 175, a diskette 170, or a recording computer 150.

In this configuration, the system 100 would monitor and analyze noise on the major trunk lines 115 coming into the head-end. This analysis would determine which part of the cable network was noisiest and allow the noise to be captured, examined, diagnosed, and filtered out or otherwise repaired. Alternatively this system can be used in a remote location such as an apartment complex, manufacturing facility, or laboratory. In this environment, the system 100 would be used to determine which part of the facility was noisiest and allow that noise to be examined, diagnosed and repaired. The alleviation of noise in a cable system or other facility will increase the signal to noise ratio of the broadband network and improve the quality of signals (television or computer data) which are transmitted over it.

The RF switch 130 is an N by M high speed switch. The switch must be able to switch any input to any output within the time span of an expected perturbation. Preferably, the switch switches within 50 milliseconds of time. More preferably, the switch switches within 20 nanoseconds of time. In a preferred embodiment switch 130 is a matrix switch disclosed in U.S. patent applications: Ser. No. 09/066207 docket No. YO998-113, filed on the same day as this invention, entitled "broadband Node Switch" to Nihal, et. al., U.S. pat. applications: Ser. No. 09/066209 docket No. YO998-114, filed on the same day as this invention, entitled "Broadband Any Point to Any Point Switch Maxtrix" to Nihal, et. al., U.S. pat. applications: Ser. No. 09/066198 No. YO998-115, filed on the same day as this invention, entitled "Broadband Switch Matrix Configuration" to Nihal, et, al. These references are herein incorporated by reference in their entirety. In alternative preferred embodiments, the N by M switch 130 can be a switch such as the Test Point Selector (model TPS-MS) by Electroline Systems Inc. which has a switching speed of 50 milliseconds. The timing constraints which need to be considered for the system 100 are discussed below in more detail in FIG. 3.

Note that in alternative preferred embodiment, multiple devices can be connected two or more of the switch outputs.

These devices 150, 170, 175 may have optional additional storage (such as a disk drive 152) and/or might be connected to a network/server 151 using well known techniques. These analyzers 160, computers 150, and plotters 175 are well known. For example, the analyzer might be an HP model 54504A Digitizing Oscilloscope and/or an HP model 8591C cable TV analyzer. The computer might be an IBM Personal Computer. The plotter might be an HP plotter.

In one preferred embodiment, the signal analyzed by the analyzer 160 will be converted into the spectral domain. In still a further preferred embodiment, signals that are properly in the band range will be removed from the spectral domain thus leaving a spectral trace of only the noise elements. In another preferred embodiment, the spectral trace of the isolated noise elements are reconverted back into the time domain and displayed on a digital oscilloscope output device.

A field of a cable plant 101 is the portion of the broadband network which is outside of the cable plant head-end 102. This field 101 is well known and typically composed of one or more HFC (hybrid fiber-coax) broadband networks as described above in the background. The field 101 is equipped with one or more RF carrier generators 110. These carrier generators 110 transmit high quality test signals with known generator signal frequencies and are located at a distance, sometimes large, from the cable head-end 102. In a preferred embodiment, these test signal frequencies lie within the range of 5–50 MHz. The test signals produced by the RE carrier generators 110 are transmitted through the field of the cable plant 101 and appear at the cable plant head-end 102 on return trunk lines 115. The generator signal frequencies are chosen such that any transient noise present in the field of the cable plant 101 will interact and interfere with the test signals they carry. For instance, if transient noise is suspected to occur within the system 100 at 25 MHz on a return trunk line 115, a carrier generator 110 can be installed in the field of cable plant 101 with a generator signal frequency of 25 MHz. When transient noise at 25 MHz in frequency enters the system 101, it will interfere with and perturb the signal appearing on the return trunk line 5 at 25 MHz.

Blocks 116 are passive taps which direct a fraction of the energy present on their respective return trunk lines 115 to the tapped return lines 125A and 125B which connect to the RF transient detectors 120 and inputs of the RF switch 130, respectively. By directing only a fraction of the energy of the return trunk lines 115 to the tapped return lines (125A, 125B), the passive taps 116 serve to attenuate the signal going to the RF transient detectors 120 and RF switch 130 and protect the detectors 120 and components within the switch from overloads due to high signal power. The passive taps 116 enable the remainder of the signal 115A to be received, used and/or analyzed by other standard equipment such as television receivers or cable modems in the head-end 102. In alternative embodiments, splitters and/or distribution amplifiers may be used in place of passive taps 116, depending on the power budgets of the return trunk lines 115, the switch 130, and the RF transient detectors 120.

The RF transient detectors 120 are devices which receive 125A test signals generated in the field of the cable plant 101 by RF carrier generators 110 and compare the received signals 125A against reference signals 110R generated by RF carrier generators 110R optionally located within the cable plant head-end. A perturbation or difference, i.e. an indicator signal generated when the received test signals 125A are compared to the reference signal 110R, indicates that a transient is present in the system 100. In an alternative embodiment, no reference signals 110R is used but the transient is detected internally by the transient detector 120. For example, a CW Tester (TM), developed by CableLabs, can be used as an RF transient detector 120. In still another alternative preferred embodiment, the RF transient detector 120 comprises a band-pass filter, e.g. a frequency agile band-pass filter, and a signal detector. In this embodiment the transient indicator 121 is produced only if a signal of a certain threshold is seen at the output of the band-pass filter. In a preferred embodiment, the band-pass filter range is between 5–40 MHz. In another preferred embodiment, two or more band-pass filters and signal detectors are used to monitor noise in two or more separate and/or overlapping band ranges. In still another preferred embodiment, the band-pass filter is adjustable so that the band range monitored can be delectable. When a transient is detected, the RF transient detector produces a transient indicator 121 which informs a controller 140 of the transient event. In one preferred embodiment, the controller 140 is the Little Giant C-Programmable Miniature Controller, part 101–0045 from Z-World Engineering of Davis, Calif., and is equipped with a DGL96 I/O Expansion board (Z-World Engineering part no. 101-0033). Each transient indicator line 121 is a small transmission line (wire) which connects each RF transient detector 120 to a dedicated I/O (input/output) pin on the DGL96 board. When the RF transient detector 120 detects a transient, it sends a voltage across the transient indicator line 121. Upon seeing a voltage, the controller 140 is alerted to the transient event. The controller 140 constantly monitors the voltage state of each line 121 and upon seeing a voltage, is alerted to the transient event.

Figure 2:
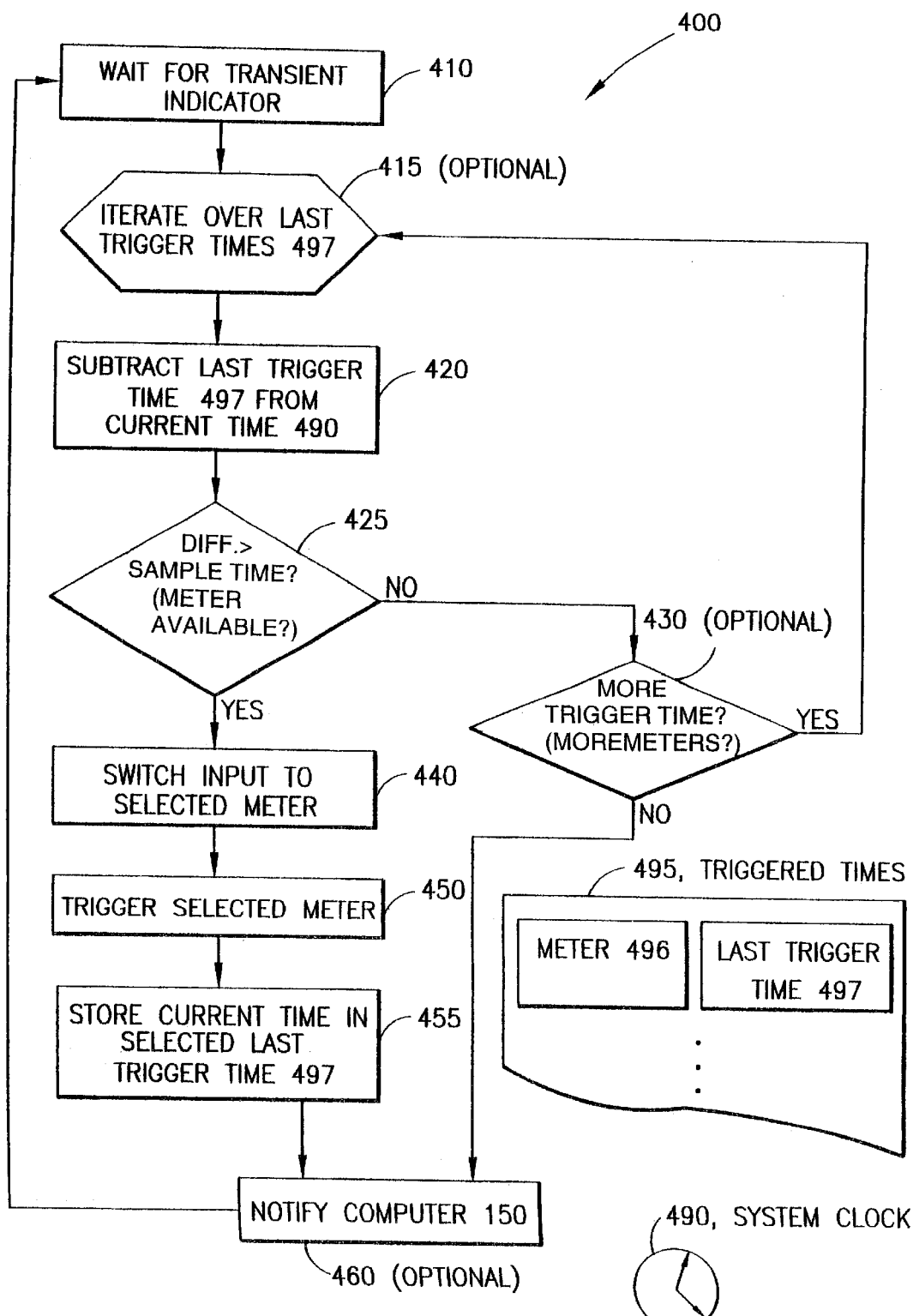
FIG. 2 is a flowchart of an alternative controller process running on a computer.

FIG. 2 is a flowchart of an alternative controller process 400 running on the controller 140. This process 400 monitors the state of the transient indicator lines 121 and configures the switch 130 to direct a found transient into a triggered meter 160 when a transient occurs. The process begins, step 410, by waiting for a transient indication to be signaled 121 from one of the RF transient detectors 120. In a preferred embodiment as described above, FIG. 1, the process 400 is operating on a Z-World Little Giant microprocessor equipped with a DLG96 I/O expansion board and the RF transient detectors 120 are connected through transient indicator lines 121 to I/O pins on the board. The RF transient detectors 120 assert their connected transient indicator line 121 causing one of the I/O pins to be held high and alerting step 410 of the transient event.

Figure 3:
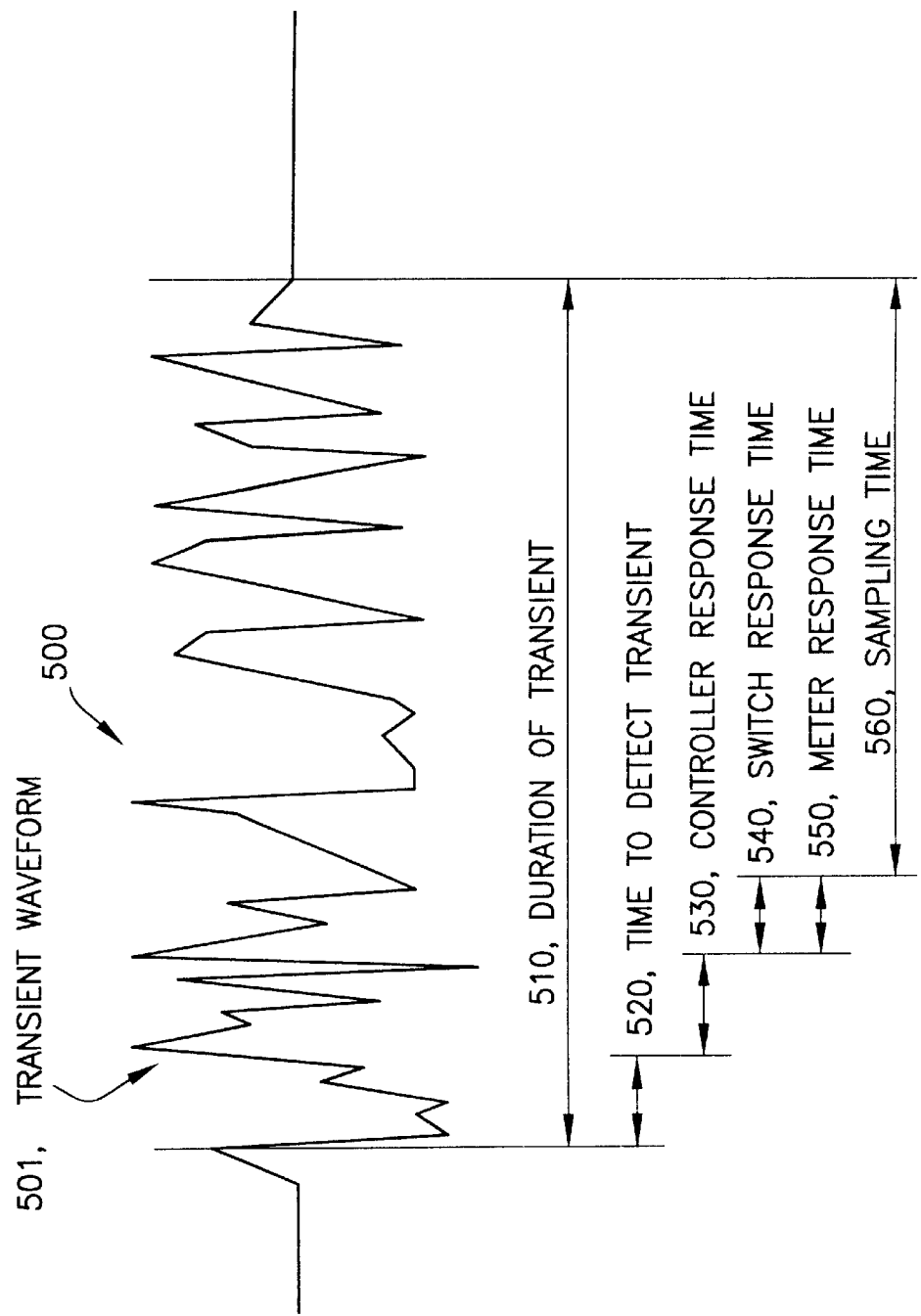
FIG. 3 is a diagram showing the timing constraints involved in capturing a transient signal.

Once a transient indication 121 has been signaled, the process continues, step 415, to locate an available meter 160 which can record and/or analyze the transient. Block 495 is a table which contains one or more meter fields 496 and one or more associated last trigger time fields 497. This table 495 is used by the process 400 to maintain a record of which meters 160 within the system 100 are actively recording transient signals. The last trigger time field 497 associated with each meter field 496 holds a time stamp of the most recent time the meter 496/160 began to record a transient signal. Because the maximum duration of a transient event is known 510 (see FIG. 3 below), by comparing the last trigger time field 497 against a system clock 490, the process 400 can determine if a meter 496 has finished recording a transient signal. FIG. 3, described below, illustrates the timing constraints involved in the system 100. Step 415 iterates over each record in the triggered lines table 495. If there is only one meter in the system 100 then step 415 (and 430) maybe skipped.

The process then, step 420, subtracts the selected last trigger time field 497 from the current time of the system clock 490. If the difference, step 425, between the two times is greater than the sampling time 560 of a transient, the selected meter 496 is available for use/reuse and the process continues to step 440. Otherwise, the process branches to step 430 and iterates to step 415 if there are more records in the triggered times table 495 which can be selected. If no meters are found to be available, step 430 branches to step 460. In step 460, the process (optionally) notifies the computer 150 that a transient event was detected. In a preferred embodiment, this notification is done through RS-232 communication. RS-232 communication is well known.

When a meter is found to be available in step 425, execution of the process 400 continues to step 440 where the switch 130 is configured so that it connects the tapped return line 125B containing the transient to the switched output 135. In the preferred embodiment described above, communication to the switch 130 is done through a number of I/O pins on the DGL96 board. Each switch input pin is associated by a one-to-one relationship with a transient indicator line 121. By applying voltage to a switch input pin, the process 400 causes the switch 130 to be configured. Once voltage is removed from an input pin the switch 130 releases the connection between the relative input signal 125B and the switched output 135. Through the use of voltages on I/O pins, the time involved in communication between the switch 130 and the controller 140 is kept to a minimum and the switch response time 540 (see FIG. 3 below) is thus reduced. In alternative embodiments, the control line 141 is an RS-232 serial communication line and the switch 130 is configured through a well known RS-232 protocol. This allows for more flexible communication and configuration of the switch 130 at the expense of switch response time 540. The Test Point Selector (model TPS-MS) made by Electroline Systems Inc. is configured through an RS-232 protocol.

After the switch 130 has been configured, step 440, the process 400 triggers the selected meter 496/160. Again, the triggering is preferably done through a voltage being applied to a meter trigger line 142. This method of triggering is well known. Note that steps 440 and 450 of the process 400 can, alternatively, be done performed in either order as the switch 130 and the meter 160 operate independently of each other. Once the meter has been triggered, it will begin to record a wave form or perform other analysis of the detected transient. The current time, as read from the system clock 490, is then recorded, step 455, in the selected last trigger time field 497. This prevents the switch 130 and selected meter 496 from being triggered and/or reconfigured when a second transient is detected while a meter 160 is in the process of recording a first transient.

The process then continues to step 460 where, optionally, the computer 150 is notified of the transient event. After executing step 460, the process branches back to step 410 to wait for notification of a next transient event.

FIG. 3 is a diagram 500 showing the timing constraints involved in capturing a transient signal 501. Each transient signal 501 has an approximate duration 510 which is characteristic of the noise source which caused the transient 501. The duration of transients 510 will typically range from between 10 and 100 milliseconds. Within the duration of the transient 510, several steps must be performed in order for the transient 501 to be captured and/or analyzed by a meter 160. Measurement 520 reflects the time taken by an RF transient detector 120 to detect the presence of a transient 501. Measurement 530 is the time taken by the controller 140 to react to the transient indicator 121 signal asserted by the RF transient detector 120, to configure the switch 130 to direct the transient 501 into the meter 160, and to trigger the meter 160 to begin capture and/or analysis. In a preferred embodiment, where the controller is a Z-World Little Giant micro controller with a 9.216 MHz clock and there is one meter 160 in the system 100, the process 400, described in FIG. 2 above, will have a response time of approximately 8.667 milliseconds. Measurement 540 is the time taken by the switch 130 to connect the input 125B holding the transient signal 501 to the switched output 135. In a preferred embodiment where the switch 130 is composed of Phillips Semiconductors NE/SA630 Single poll double throw switches, the response time of the switch will be 20 nanoseconds. In alternative embodiments where the switch 130 is a Test Point Selector (model TPS-MS) by Electroline Systems Inc., the switch 130 has a switch response time 540 of 50 milliseconds. Measurement 550 is the meter response time, i.e. the time taken by the meter 160 to react to a signal raised by the controller 140 over the meter trigger line 142. Note that because the switch 130 and the meter 160 are independent devices, their response times 540 and 550, respectively, can overlap. Measurement 560 is the duration of time in which the transient signal is acquired by the meter 160 and captured and/or analyzed.

In order to capture and/or analyze a transient 501 effectively, it is important to understand the expected duration 510 of the types of transients 501 which may occur on the lines 115 and to choose equipment (i.e. the RF transient detectors 120, the switch 130, the controller 140, and the meters 160) with appropriate response times (520, 530, 540, and 550, respectively) so that enough of the transient wave form 501 is directed into the meter 160 during the resultant sampling time 560 to identify and characterize the transient 501. In the preferred embodiment presented above, where the switch is the matrix switch cited above, the switch 130 and controller 140 have been chosen so that their response times 530 and 540, respectively, are minimized. This lengthens the amount of transient wave form 501 which is sent into the meter 160. In an alternative embodiment where the switch is a Test Point Selector (model TPS-MS) by Electroline Systems Inc. with a switch response time 540 of 50 milliseconds, only transients 501 which have a duration of over 50 milliseconds can be captured and/or analyzed by the meter 160. The 50 millisecond response time is appropriate for certain types of transients, such as those resulting from devices with small capacitors, but too lengthy for others. Note that the sampling time 560 does not necessarily have to last to, and stop at, the end of the transient 501. In a preferred embodiment, the sampling time 560 is set so that the transient wave form 501 is directed into the meter 501 for the remainder of its duration 510. In alternative embodiments, the sampling time 560 may be shorter than the remainder of a transient wave forms 501 expected duration 510 or, the sampling time 560 may extend past the transient wave forms 501 duration 510. Choice of sampling time 560 is made based on the type of transients 501 which are to be analyzed and/or recorded, the complexity and detail of information which is to be extracted from each transient 501, and the choice of meter 160 used to monitor the transient wave form 501.

Given this disclosure alternative equivalent embodiments will become apparent to those skilled in the art. These embodiments are also within the contemplation of the inventors.

We claim:

1. A broadband network monitoring system comprising:
   at least two Radio Frecquency (RF) transient detectors, each RF transient detector sensing an RF line signal on one of at least two broadband lines in the broadband network, each RF transient detector detecting transients on a corresponding broadband line and producing a transient indicator when there is a transient on the RF line signal of the corresponding broadband line;
   an RF switch with two or more inputs, each of the two or more of the inputs capable of receiving one of the RF line signals, the RF switch capable of directing any one of the RF line signals to one or more RF switch outputs;
   one or more analyzing devices each connected to one of the RF switch outputs; and
   a controller connected to each of the RF transient detectors and to the RF switch, the controller causing the RF switch to connect the RF line signal sensed by one of the respective RF transient detectors to one of the analyzing devices when the transient indicator for the one RF transient detector is produced.

2. A system, as in claim 1, further comprising:
   one or more RF carrier generators connected to the at least two broadband lines, each RF carrier generator generating a generator signal having a generator signal frequency; and
   where one of the RF transient detectors sensesa line signal on one of the broadband lines by examining one of the generator signal frequencies to detect a signal perturbation at the generator signal frequency, the one RF transient detector producing its transient indicator when there is a transient on the one generator signal frequency.

3. A system, as in claim 1, where the analyzing device records the time when the transient indicator was produced.

4. A system, as in claim 1, where the analyzing device converts the transient into the spectral domain.

5. A method of monitoring transients on a plurality of broadband lines in a broadband network, comprising the steps of:
   detecting a transient on one of the broadband lines;
   producing a transient indicator, corresponding to the broadband line with the transient, when the transient is detected;
   determining availability of an analyzer in order to connect the broadband line with the transient to the analyzer;
   providing a Radio Frequency (RF) switch comprising an input for each of the broadband lines and at least one output; and
   configuring the RF switch to connect the broadband line with the transient, as determined by the transient indicator, to the analyzer, if available.

6. A method, as in claim 5, further comprising the step of triggering the analyzer when the transient indicator is produced.

7. A method, as in claim 5, where the analyzer is any one or more of the following: a digital oscilloscope, a computer, a cable TV analyzer.

8. A system for monitoring transients on a plurality of broadband lines in a broadband network, comprising:
   means for detecting a transient on one of the broadband lines and producing a transient indicator, corresponding to the broadband line with the transient, when the transient is detected;
   means for determining availability of an analyzer in order to connect the broadband line with the transient to the analyzer;
   a Radio Frequency (RF) switch means for coupling one of the broadband lines to an output; and
   means for configuring the RF switch means to connect the broadband line with the transient, as determined by the transient indicator, to the analyzer, if available.

* * * * *